(12) United States Patent
Kamp

(10) Patent No.: US 10,159,917 B2
(45) Date of Patent: Dec. 25, 2018

(54) FILTER DEVICE HAVING A DIVERGING CLEANING DUCT WITH INTERNAL PARTITIONS

(71) Applicant: N.V. PWN WATERLEIDINGBEDRIJF NOORD-HOLLAND, Velserbroek (NL)

(72) Inventor: Petrus Cornelis Kamp, Egmond aan de Hoef (NL)

(73) Assignee: N.V PWN WATERLEIDINGBEDRIJF NOORD-HOLLAND, Velserbroek (NL)

( * ) Notice: Subject to any disclaimer, the term of this patent is extended or adjusted under 35 U.S.C. 154(b) by 438 days.

(21) Appl. No.: 15/028,541

(22) PCT Filed: Oct. 7, 2014

(86) PCT No.: PCT/NL2014/050695
§ 371 (c)(1),
(2) Date: Apr. 11, 2016

(87) PCT Pub. No.: WO2015/053622
PCT Pub. Date: Apr. 16, 2015

(65) Prior Publication Data
US 2016/0263498 A1    Sep. 15, 2016

(30) Foreign Application Priority Data
Oct. 11, 2013  (NL) ..................................... 2011597

(51) Int. Cl.
*B01D 29/66*   (2006.01)
*B01D 29/23*   (2006.01)
(Continued)

(52) U.S. Cl.
CPC ............ *B01D 29/66* (2013.01); *B01D 29/114* (2013.01); *B01D 29/23* (2013.01); *B01D 29/52* (2013.01);
(Continued)

(58) Field of Classification Search
CPC combination set(s) only.
See application file for complete search history.

(56) References Cited

U.S. PATENT DOCUMENTS

| 3,319,793 A | 5/1967 | Miller et al. |
| 4,051,033 A * | 9/1977 | Blace ..................... B01D 37/02 210/193 |

(Continued)

FOREIGN PATENT DOCUMENTS

| DE | 59 699 C | 1/1891 |
| EP | 0 343 061 A1 | 11/1989 |

(Continued)

OTHER PUBLICATIONS

International Search Report, dated Apr. 9, 2015, from corresponding PCT application.

*Primary Examiner* — Krishnan S Menon
*Assistant Examiner* — Waqaas Ali
(74) *Attorney, Agent, or Firm* — Young & Thompson

(57) ABSTRACT

A filter device includes a housing with an end part and a side wall and containing an axially arranged array of filter elements, such as ceramic elements. An inlet in the end part supplies fluid to the filter elements and an outlet in the side wall is provided for transporting filtered fluid from the housing, the side wall of the filter device being provided with a cleaning duct for supplying cleaning fluid to the filter elements via the side wall. The cleaning duct 6 includes a distal channel portion 15 having a relatively small diameter D1 and a proximal portion 16 adjacent the side wall having (Continued)

a relatively large diameter D2. A number of partitions 36, 37 extend in the proximal portion from a position at or near the sidewall towards the distal channel portion 15 at an angle (β) to a center line 20 of the cleaning duct 6.

19 Claims, 6 Drawing Sheets

(51) Int. Cl.
  B01D 29/11 (2006.01)
  B01D 29/90 (2006.01)
  B01D 29/52 (2006.01)
(52) U.S. Cl.
  CPC ...... B01D 29/902 (2013.01); *B01D 2201/313* (2013.01); *B01D 2201/44* (2013.01)

(56) References Cited

U.S. PATENT DOCUMENTS

| | | | |
|---|---|---|---|
| 4,231,770 | A | 11/1980 | Johnson, Jr. |
| 4,311,591 | A | 1/1982 | Eimer et al. |
| 4,666,592 | A | 5/1987 | Bea |
| 5,032,153 | A | 7/1991 | Cattin |
| 5,165,452 | A * | 11/1992 | Cheng .................... F24F 13/06 138/37 |
| 2004/0055470 | A1 | 3/2004 | Strauser et al. |

FOREIGN PATENT DOCUMENTS

| | | |
|---|---|---|
| EP | 2 450 093 A1 | 5/2012 |
| FR | 1 443 332 A | 6/1966 |
| GB | 2 055 301 A | 3/1981 |
| NL | 20 100 02 A | 6/2014 |

\* cited by examiner

FILTER DEVICE HAVING A DIVERGING CLEANING DUCT WITH INTERNAL PARTITIONS

FIELD OF THE INVENTION

The invention relates to a filter device comprising a housing with an end part and a side wall and containing an axially arranged array of filter elements, an inlet for supplying fluid to the filter elements and an outlet for transporting filtered fluid from the housing, the side wall of the filter device being provided with a cleaning duct for supplying cleaning fluid to the filter elements via the side wall.

BACKGROUND OF THE INVENTION

Such a filter device is used in water treatment facilities, wherein the filter is formed by an array of ceramic or polymer filter elements through which the raw water passes. When the pores of the filter elements after a period of use become blocked by filtered-out suspended matter in the treated water, a large volume of cleaning fluid is backwashed in a short time at a pressure of several bars (for instance up to 5 bar, depending on the strength of the filter element) in counter flow through the filter elements. Directing the cleaning fluid onto the filter elements will result in considerable head loss and an uneven distribution of the cleaning fluid across the filter elements. The resulting head loss and dynamic forces like water hammer can also lead to excessive forces on the filter elements and consequent damage.

The outlet and the cleaning duct can be formed by separate pipes but can also be combined. It is therefore an object of the present invention to provide a filter device having a cleaning duct supplying cleaning fluid at controlled outflow condition ensuring a reduced head loss and an even distribution of cleaning fluid across the filter elements.

It is another object to provide a filter device having a relatively small footprint. It is a further object to provide a filter device in which large volumes of cleaning fluid can be supplied to the filter in a short time at high pressures without the risk of water hammer.

SUMMARY OF THE INVENTION

Hereto, a filter device according to the invention is characterised in that the cleaning duct comprises a distal channel portion having a relatively small diameter D1 and a proximal portion adjacent the sidewall having a relatively large diameter D2, a number of partitions extending in the proximal portion from a position at or near the sidewall towards the distal channel portion at an angle ($\beta$) to a centre line of the cleaning duct.

By use of the partitions, sub-channels are formed in the cleaning fluid duct that result in a gradual decrease in outflow velocity that reduce turbulence in the outflow channel, even when the outflow diameter D2 is relatively large and the length of the proximal cleaning channel portion is relatively short. The angle ($\beta$) of the partitions with the center line of the cleaning fluid duct is less than 20°, preferably less than 10°, more preferably less than 8°.

In one embodiment, the proximal channel portion comprises a peripheral wall that is at an angle ($\alpha$) with respect to the centre line of between 100 and 700, preferably between 300 and 600, more preferably about 450. The short proximal channel portion is strongly diverging to cover a large surface area of the filter housing, so that the filter elements in the housing are effectively flushed over their entire height while the total volume of the moving cleaning fluid is reduced and thus the effects of water hammer are minimised.

In another embodiment, a cross-section of the cleaning duct near the sidewall is rectangular, the duct having sidewalls and transverse walls, wherein the partitions bridge the distance between the sidewalls and/or between the transverse walls. In such a rectangular cleaning duct, the partitions may be flat, plate-shaped elements arranged in a grid-shaped configuration to form a diffusor. Alternatively the cross-section of the cleaning duct may be of circular shape, the partitions being formed of coaxial conical members.

A further embodiment of a filter device according to the invention is characterised in that inside the housing a cylindrical distributor element is provided, comprising a perforated wall at a distance from the cylindrical wall, an annular flow channel being defined between the distributor element and the wall.

By the distributor element, the inflowing cleaning fluid entering the housing through the cleaning duct is distributed circumferentially around the filter elements, before entering into the filter elements. Hereby the differences in velocity in the fluid entering into the flow channel is reduced, which limits the pressure differences and a circumferential even distribution of the cleaning fluid across the array of filter elements is warranted. Furthermore, the distributor element prevents forces on the filters elements nearest to the inlet of the fluid in the housing wall from exceeding a predetermined maximum value.

The distributor element may be formed by a perforated cylindrical wall, extending inside the housing at a distance from the inner housing wall, the perforations extending substantially along the height of the distributor wall.

In a preferred embodiment, a distance of the distributor element from the cylindrical wall decreases when going from a position on the cylindrical wall near the cleaning duct to a position diametrically opposite the cleaning duct. In this way the velocity differences around the perimeter of the distributor wall after entering into the circumferential flow channel around the filter elements are reduced and thus the pressure differences, because of the flow channel's decreasing diameter in the flow direction, i.e. in the direction away from the inflow position of the cleaning fluid. This helps further diminish the head loss and improve the cleaning fluid distribution. The annular distributor element may be placed in an eccentric position relative to the outer wall, in closer proximity to the outer wall for circumferential positions that are located further away from the cleaning duct.

BRIEF DESCRIPTION OF THE DRAWINGS

Some embodiments of a filter device in accordance with the present invention will, by way of non-limiting example, be described in detail with reference to the accompanying drawings. In the drawings:

FIG. 1 shows a filter device 1 for use in water treatment plants, comprising a filter housing 2 with an array of filter elements 3. The process water flows into the filter housing 2 via an inlet valve 8 and an inlet duct 4 at the bottom 5' of the housing 2. A cleaning outlet duct 14 is connected to the bottom 5' of the housing 2, but could equally be connected to the top 5 of the housing 2, via a cleaning fluid outlet valve 9. A duct 6 is connected to a sidewall 7 of the housing and transports filtered water via an outlet valve 10 to an outflow duct 12. A cleaning fluid reservoir 13 is connected to the duct 6 via a cleaning fluid inlet valve 11.

Figure 1:
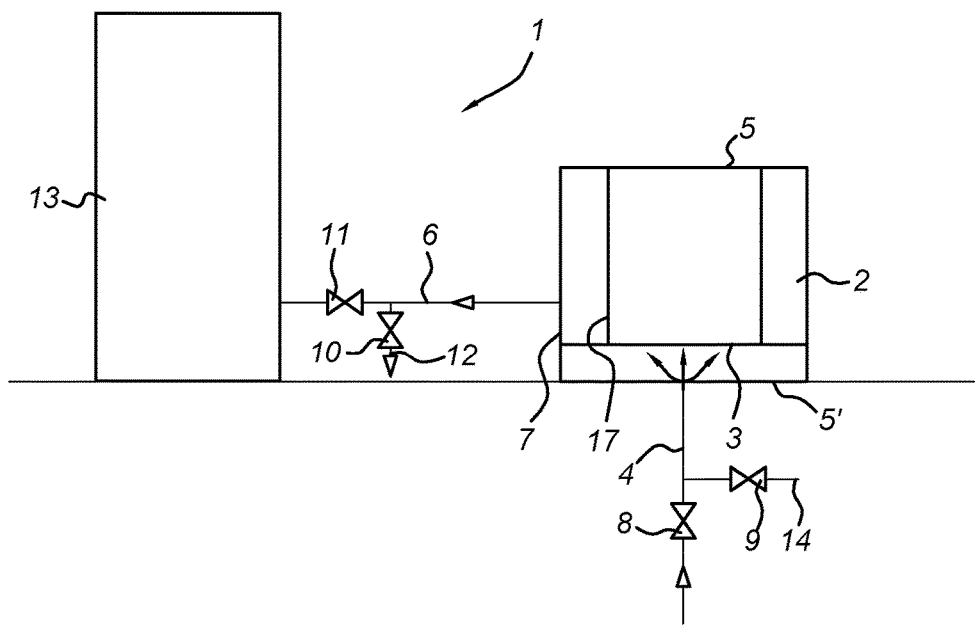
FIG. 1 shows a schematic lay-out of the filter device and cleaning fluid reservoir in the water treatment mode.

In the filtering mode, process water enters in an axial direction into the array of ceramic elements 3, and leaves the array through a side surface 17 of the filter elements. The inlet valve 8 is opened while the cleaning fluid outlet valve 9 is closed. The filtered water passes through the sidewall of the housing 2 to the duct 6 and via the outlet valve 10 to the outlet 12. The cleaning fluid inlet valve 11 is closed and the cleaning fluid, such as water which is pressurised at a pressure of about 5 bar, is contained in the cleaning fluid reservoir 13.

Figure 2:
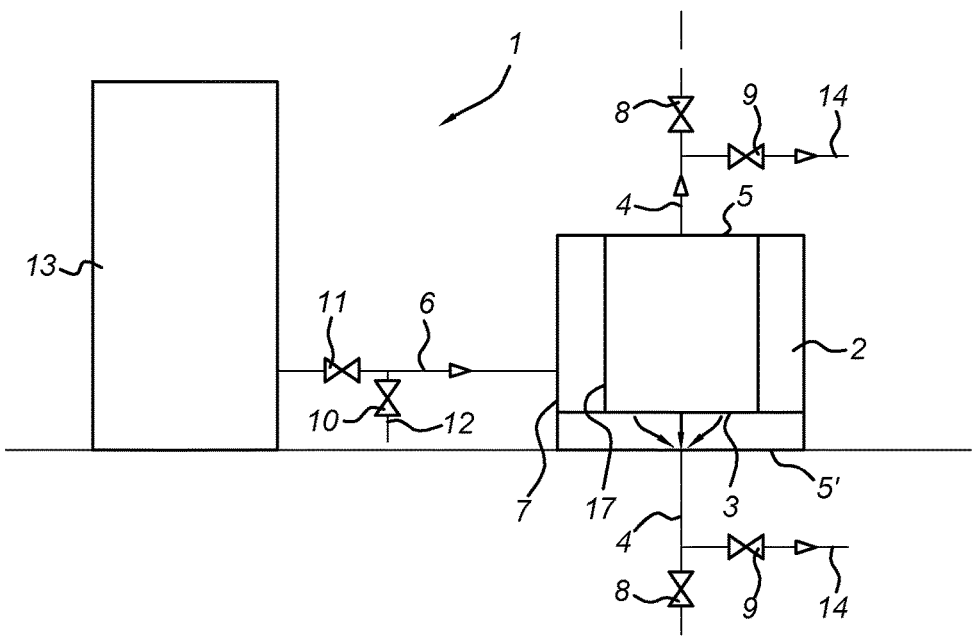
FIG. 2 shows the filter device of FIG. 1 in a reverse flow cleaning mode.

In the cleaning mode, such as shown in FIG. 2, the valves 11 and 9 are opened while the inlet and outlet valves 8 and 10 are closed. Within a few seconds, 1000 L of water or more are transported at a pressure of 5 bar from the reservoir 3 in reverse flow through the filter elements 3 such that suspended matter adhering to the filter elements and blocking the pores, is removed and flushed out through the cleaning outlet duct 14. A cleaning reservoir arrangement suitable for use with the filter device of the present invention is described in NL 2 010 002 that was filed in the name of the applicant.

Figure 3:
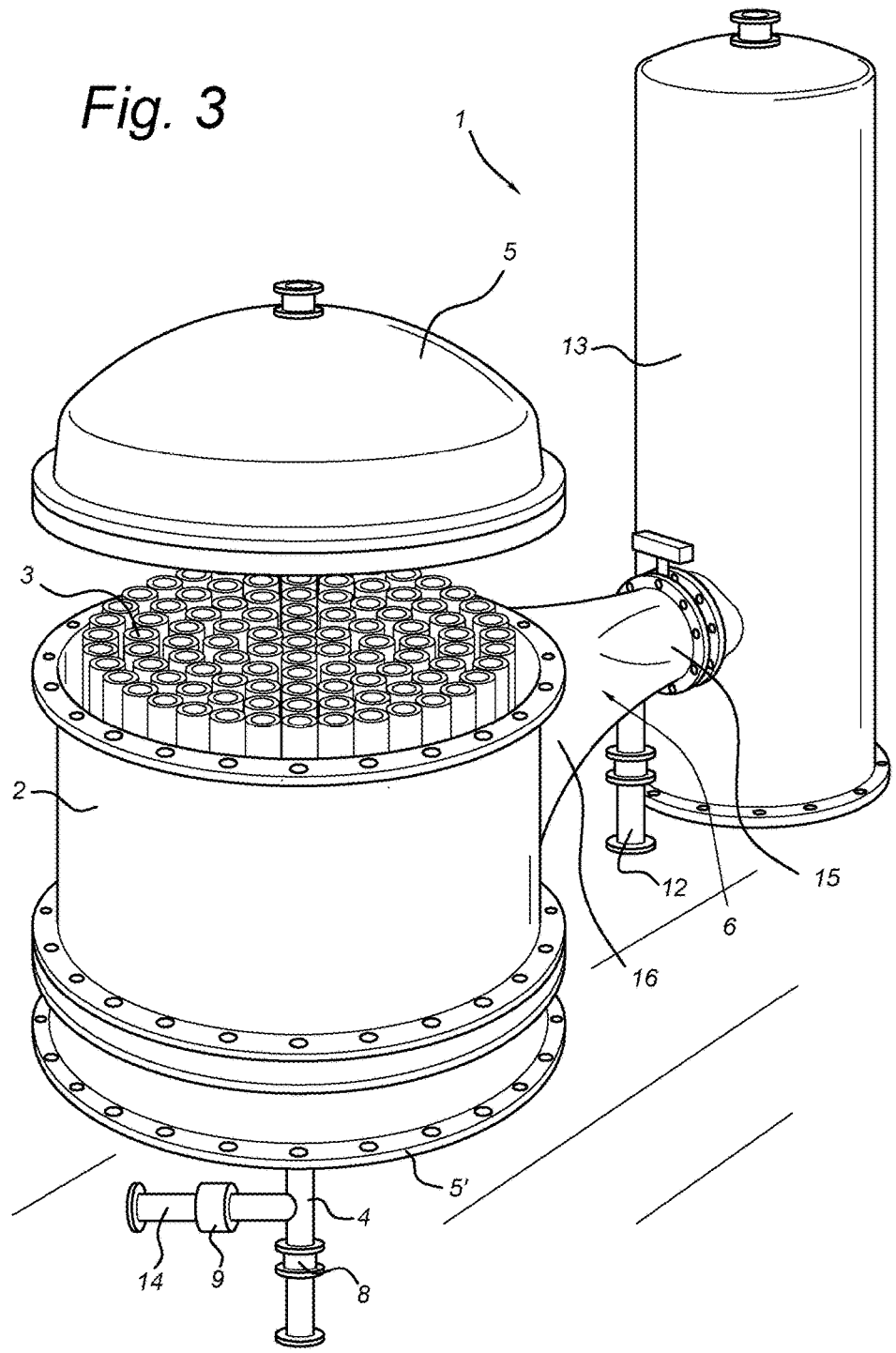
FIG. 3 shows a three-dimensional view of the filter device of the present invention comprising an array of ceramic filter elements.
Figure 4:
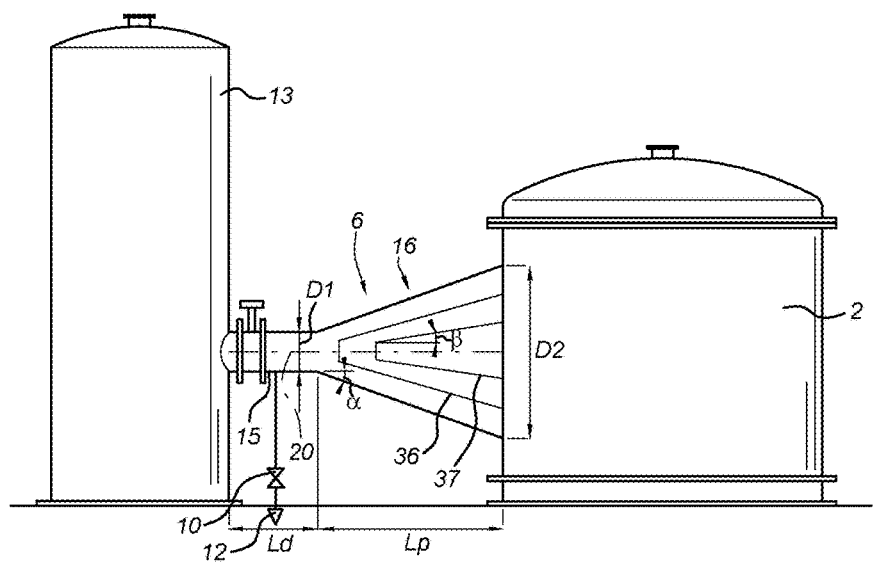
FIG. 4 shows a cross-sectional side view of the device of FIG. 3 comprising a set of nested conical partitions of the type shown in FIG. 7, FIGS. 5 and 6 show a cross-section of a rectangular cleaning fluid duct having horizontal partitions and a grid-shaped partition structure, respectively.

In order for the cleaning fluid to have a gradual decrease in velocity upon entry into the housing 2 and to reduce energy losses and prevent water hammer by sudden pressure increase, the duct 6 is provided with a relatively narrow distal duct section 15 and a diverging duct section 16, as shown in FIG. 3.

The distal duct section 15 has a diameter D1 of for instance 80 cm and has a length Ld of about 0.5 m-2 m and the diverging duct section 16 has a length Lp of about 0.3 m-2 m and a diameter D2 at the position of the sidewall 2 of 140 cm. The angle α of the outer diverging walls of the proximal duct section 16 relative to the centre line 20 of the cleaning duct 6, is for instance about 11 degrees. The compact footprint of the filter device according to the invention allows the use of several cleaning fluid reservoirs and filter housings 2, multiple filter housings 2 being connected to one reservoir 13, with a capacity of for instance several thousand L/hour in a single small sized water treatment facility.

Inside the diverging proximal channel section 16 is a number of plate-shaped partitions 21,22, 23, 24 that extend along the entire width (perpendicular to the plane of the drawing) of the proximal channel section 16. The partitions 21-24 are at an angle β of between 5° and 20° relative to the centre line 20.

Figure 5:
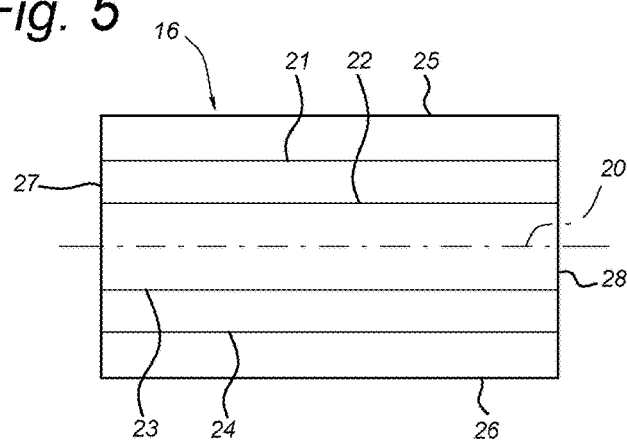
Figure 6:
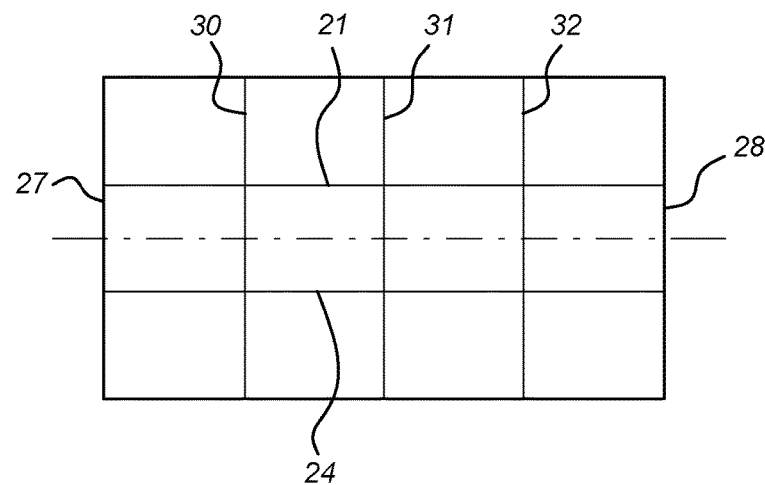
Figure 7:
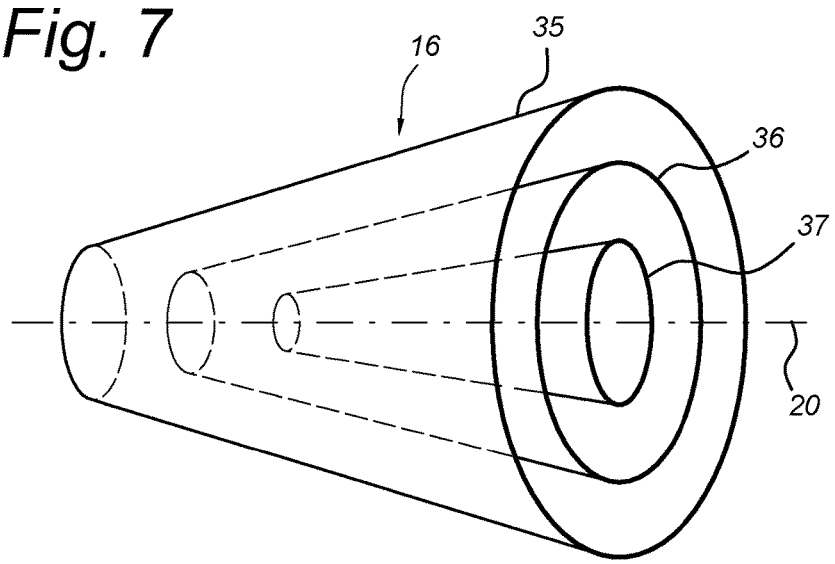
FIG. 7 shows the proximal cleaning duct section of circular cross-section an nested conical partitions.

FIG. 5 shows a cross-sectional view of the proximal channel section 16 near the position of the sidewall of the housing 2. The channel section is bounded by top and bottom walls 25, 26 and side walls 27, 28. The partitions 21-24 are symmetrically arranged with respect to the channel centre line 20. In the embodiment of FIG. 6, the partitions 21-24 that are parallel to the top and bottom walls 25, 26, together with transverse partitions 30, 31, 32 that are parallel to the side walls 27, 28, form a grid-like diffuser construction.

In FIG. 6 an embodiment is shown in which the cross-sectional shape of the outer wall 35 of the channel section 16 is circular, and the partitions 36, 37 are formed of conical segments centred around the centre line 20.

Figure 8:
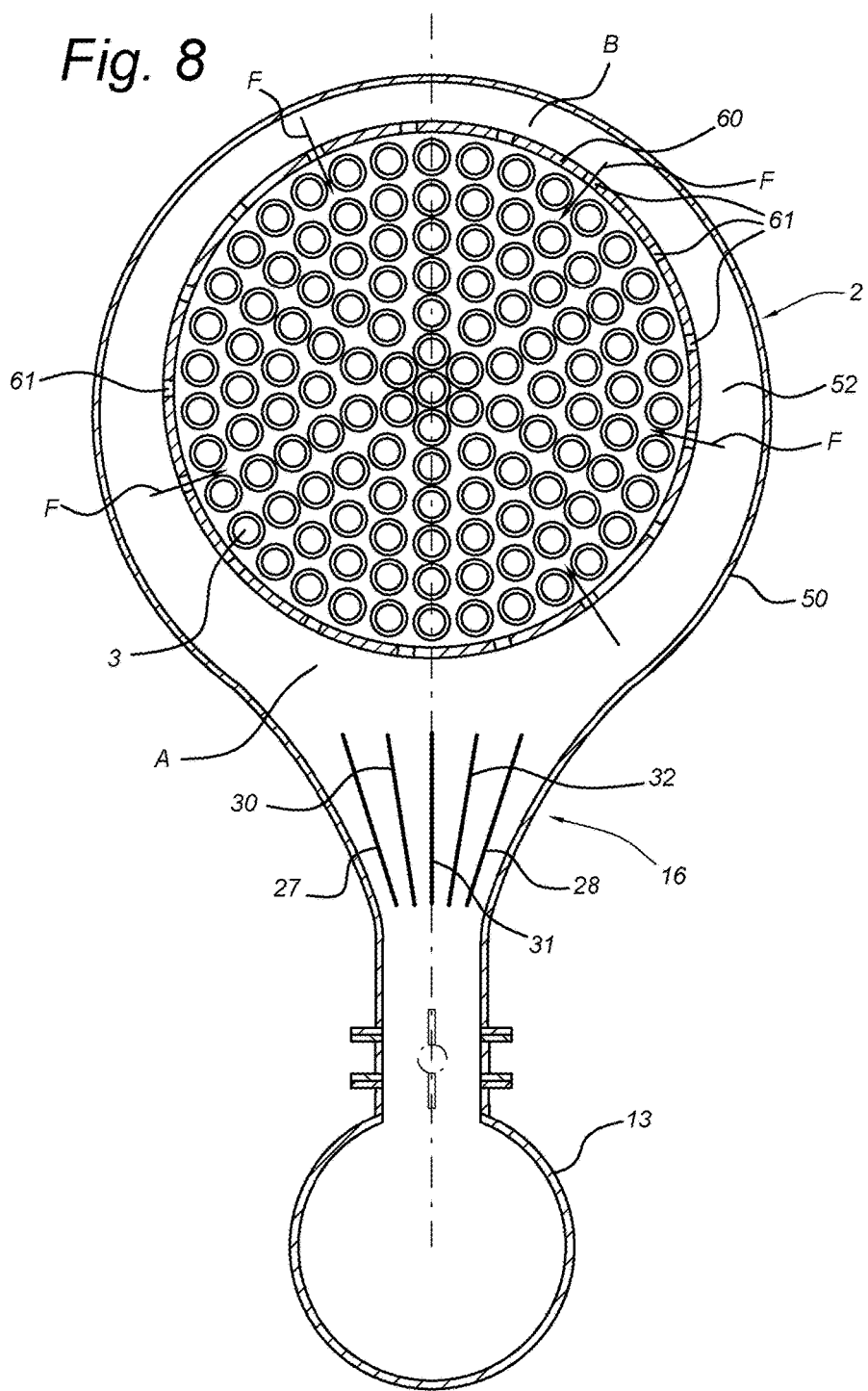
FIG. 8 shows transverse cross-sectional view of the filter housing comprising an inner perforated ring-shaped distributor element, and FIG. 9. shows a perspective view of the perforated ring-shaped distributor element of FIG. 8.

In the embodiment shown in FIG. 8, it can be seen that a perforated annular inner wall 60 is placed inside the housing 2. Water is entering in between adjacent cylindrical filter elements 3, through the holes 61 of the inner wall 60 in the direction of arrows F. The cylindrical outer wall 50 of the housing 2 is offset from the centre of the perforated inner wall 60, the outer wall 50 and the perforated inner wall 60 being situated closer together at circumferential positions that are further away from the channel section 16. In this way, the diameter of the circumferential flow channel 52 is larger at position A closer to the channel 16 than at position B. At position A for instance a distance between the outer wall 50 and the inner wall 60 is about 25 cm whereas at position B this distance amounts to 5 cm. Water entering into the housing via channel section 16 is diffused through the openings 61 in the inner wall 60 and partly flows through the channel 52 around the outside of inner wall 60 in a circumferential direction while maintaining sufficient pressure to radially enter into the filter elements that are disposed within the perforated wall 60 while preventing excess pressure on the filter elements near position A. In this way, the head loss of the fluid entering into the flow channel reduced and an even azimuthal distribution of cleaning fluids entering into the filter elements in a radial direction, is obtained.

Figure 9:
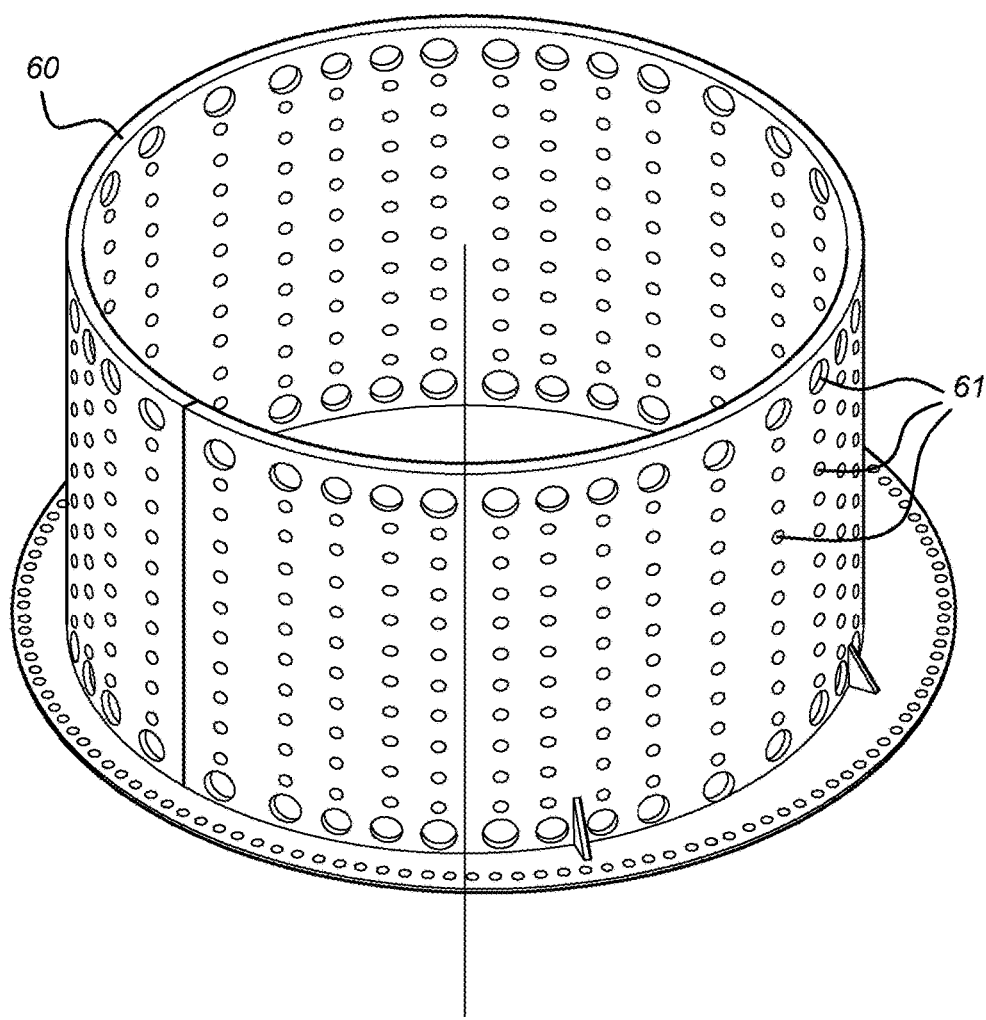

As can be seen in FIG. 9, the holes 61 at the upper and lower sides of the inner wall 60 are of larger diameter in view of the reduced diameter of the cylindrical filter elements, which at the axial position of the upper and lower sides of the wall 60 are provided with a connector of a reduced diameter.

Furthermore, the holes 61 are aligned in the axial direction to form vertical rows that are situated in such a perimetrical position that they allow cleaning fluid to pass between adjacent cylindrical filter elements that are placed in proximity to the holes.

The invention claimed is:

1. Filter device (1) comprising a housing (2) with an end part (5) and a cylindrical side wall (7) and containing an axially arranged array of filter elements (3), an inlet (4) for supplying fluid to the filter elements and an outlet (12) for transporting filtered fluid from the housing, the side wall (7) of the filter device being provided with a cleaning duct (6) for supplying cleaning fluid to the filter elements (3) via the side wall (7), the cleaning duct (6) comprising a distal channel portion (15) having a relatively small diameter D1 and a proximal portion (16) adjacent the side wall (7) having a relatively large diameter D2, a number of partitions (21,22,23,24) extending in the proximal portion (16) from a position at or near the sidewall (7) towards the distal channel portion (15) at an angle (β) to a centre line (20) of the cleaning duct (6).

2. Filter device (1) according to claim 1, wherein the proximal channel portion (16) comprises a peripheral wall that is at an angle (α) with respect to the centre line (20) of between 10° and 70°.

3. Filter device (1) according to claim 1 wherein the angle (β) is less than 20°.

4. Filter device (1) according to claim 1, wherein a cross-section of the cleaning duct (16) near the sidewall (7) is rectangular, the duct having sidewalls (27,28) and transverse walls (25,26), wherein the partitions (21,22,23,24) bridge the distance between the sidewalls (27,28) and/or between the transverse walls (25,26).

5. Filter device (1) according to claim 1, the partitions being flat, plate-shaped elements arranged in a grid-shaped configuration.

6. Filter device (1) according to claim 3, the cross-section of the cleaning duct being of circular shape, the partitions being formed of coaxial conical members (36,37).

7. Filter device (1) according to claim 1, wherein inside the housing a cylindrical distributor element (60) is provided, comprising a perforated wall at a distance from the cylindrical wall (7), an annular flow channel being defined between the distributor element and the wall.

8. Filter device (1) according to claim 7, a distance of the distributor element (60) from the cylindrical wall (7) decreasing when going from a position (A) on the annular wall near the cleaning duct (6) to a position (B) diametrically opposite the cleaning duct.

9. Filter device (1) according to claim 7, the distributor element comprising a perforated annular inner wall (60) having openings (61) distributed along its circumferential surface.

10. Filter device (1) according to claim 2, wherein the proximal channel portion (16) comprises a peripheral wall that is at an angle (α) with respect to the centre line (20) of between 30° and 60°.

11. Filter device (1) according to claim 10, wherein the proximal channel portion (16) comprises a peripheral wall that is at an angle (α) with respect to the centre line (20) of about 45°.

12. Filter device (1) according to claim 1, wherein the angle (β) is less than 10°.

13. Filter device (1) according to claim 12, wherein the angle (β) is less than 8°.

14. Filter device (1) according to claim 2, wherein a cross-section of the cleaning duct (16) near the sidewall (7) is rectangular, the duct having sidewalls (27,28) and transverse walls (25,26), wherein the partitions (21,22,23,24) bridge the distance between the sidewalls (27,28) and/or between the transverse walls (25,26).

15. Filter device (1) according to claim 3, wherein a cross-section of the cleaning duct (16) near the sidewall (7) is rectangular, the duct having sidewalls (27,28) and transverse walls (25,26), wherein the partitions (21,22,23,24) bridge the distance between the sidewalls (27,28) and/or between the transverse walls (25,26).

16. Filter device (1) according to claim 2, the partitions being flat, plate-shaped elements arranged in a grid-shaped configuration.

17. Filter device (1) according to claim 3, the partitions being flat, plate-shaped elements arranged in a grid-shaped configuration.

18. Filter device (1) according to claim 4, the cross-section of the cleaning duct being of circular shape, the partitions being formed of coaxial conical members (36, 37).

19. Filter device (1) according to claim 8, the distributor element comprising a perforated annular inner wall (60) having openings (61) distributed along its circumferential surface.

* * * * *